US006670949B1

(12) United States Patent
Ahn et al.

(10) Patent No.: US 6,670,949 B1
(45) Date of Patent: Dec. 30, 2003

(54) DIGITIZER

(75) Inventors: Young-Soo Ahn, Kyonggi-do (KR);
Yun-Cheol Jeong, Seoul (KR);
Young-Jin Oh, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 16 days.

(21) Appl. No.: 09/619,538

(22) Filed: Jul. 19, 2000

(30) Foreign Application Priority Data

Jul. 19, 1999 (KR) ........................................ 1999-29057

(51) Int. Cl.[7] ................................................ G09G 5/00
(52) U.S. Cl. .......................... 345/173; 345/174; 349/12; 178/18.03; 178/18.04
(58) Field of Search ................. 178/18.03, 18.05; 345/173, 174, 177, 178, 179; 349/12

(56) References Cited

U.S. PATENT DOCUMENTS

| | | | | |
|---|---|---|---|---|
| 5,045,644 A | * | 9/1991 | Dunthorn | 178/18.05 |
| 5,451,724 A | * | 9/1995 | Nakazawa et al. | 178/18.05 |
| 5,757,361 A | * | 5/1998 | Hirshik | 178/18.03 |
| 5,796,389 A | * | 8/1998 | Bertram et al. | 345/173 |
| 5,963,277 A | * | 10/1999 | Kim et al. | 349/12 |
| 6,191,828 B1 | * | 2/2001 | Kim et al. | 349/12 |
| 6,204,897 B1 | * | 3/2001 | Colgan et al. | 349/12 |

* cited by examiner

*Primary Examiner*—Steven Saras
*Assistant Examiner*—Uchendu O. Anyaso
(74) *Attorney, Agent, or Firm*—McKenna Long & Aldridge LLP (57) ABSTRACT

An apparatus for locating a point physically touched and producing an electrical signal corresponding to the location includes an insulating substrate; a resistor touch pattern supported on the insulating substrate; and a protective insulating plate arranged over the resistive touch pattern. The resistive touch pattern has a plurality of strip resistors parallel to a center line; a plurality of linear resistors connected to the strip resistors, the resistance of the linear resistors decreasing with distance from the center line; first and third terminals positioned on an intermediate point of alternate edges of the touch pattern; and second and fourth terminals, positioned on an intermediate point of other alternate edges of the touch pattern. The resistive value of the linear resistors selected for a corresponding strip resistor so as to produce equal potential at a corresponding selected point on all said strip resistors.

17 Claims, 6 Drawing Sheets

DIGITIZER

CROSS REFERENCE

This application claims the benefit of Korean Patent Application No. 1999-29057, filed on Jul. 19, 1999, under 35 U.S.C. §119, the entirety of which is hereby incorporated by reference.

BACKGROUND OF THE INVENTION

1. Field of the Invention

The present invention relates to a digitizer, and more particularly, to a digitizer for use in a liquid crystal display (LCD) device.

2. Discussion of the Related Art

A digitizer is one of a class of devices that responds to location information input by a finger or a stylus on a touch panel to generate paired analog coordinate signals corresponding to the location on a touch panel to which the finger or stylus has been applied. In a digitizer, the generated analog coordinate signals are digitized and conveyed to a display device for use in a.notebook computer. Digitizers have also been used generally in computer graphics, computer aided design (CAD), and computer aided manufacturing systems.

Figure 1:
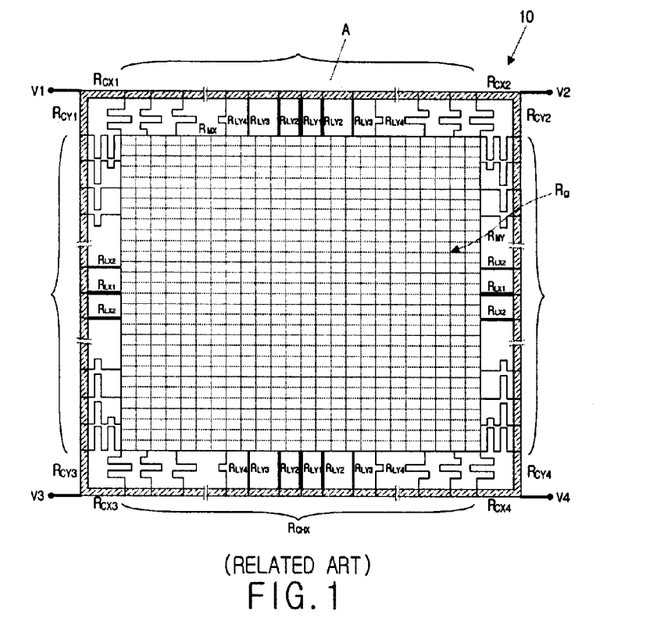
FIG. 1 is a plan view illustrating a tablet of a conventional digitizer.

FIG. 1 shows a resistive touch panel 10 of a conventional digitizer disclosed in U.S. Pat. No. 4,853,493, having a resistive layer represented at grid "Rg", a plurality of linear resistors $R_{LXN}$ and $R_{LYN}$, chain resistors $R_{CHX}$ and $R_{CHY}$, and corner resistors $R_{CXN}$ and $R_{CYN}$. Corner resistors $R_{CX1}$ and $R_{CY1}$ are coupled or connected with terminal $V_1$; corner resistors $R_{CX2}$ and $R_{CY2}$ are coupled or connected with terminal $V_2$; comer resistor $R_{CX3}$ and $R_{CY3}$ are coupled or connected with terminal $V_3$; and comer resistors $R_{CX4}$ and $R_{CY4}$ are coupled or connected with terminal $V_4$. The terminals $V_1$, $V_2$, $V_3$ and $V_4$ are coupled or connected to a digitizer drive circuit (not shown).

To derive signals representing analog coordinate pairs corresponding to the position of the stylus or the finger in the conventional digitizer of FIG. 1, a reference potential is alternately applied to every two adjacent terminals, moving in a clockwise or counterclockwise direction using predetermined switching techniques. The reference potential is derived from a voltage source (not shown). For example, in case of a clockwise direction, when an a.c. reference voltage of 5 volts is applied to the terminals $V_1$ and $V_2$, the terminals $V_3$ and $V_4$ are retained in a 'ground' condition. Further, when an a.c. reference voltage of 5 volts is applied to the terminals $V_2$ and $V_4$, the terminals $V_1$ and $V_3$ are retained in a 'ground' condition. Electrical signals from the digitizer drive circuit are applied to the chain resistors $R_{CHX}$ and $R_{CHY}$ through the corner resistors $R_{CX}$ and $R_{CY}$ and then applied to the grid resistor Rg through a plurality of the linear resistors $R_{LXN}$ and $R_{LYN}$. The resistance of the linear resistors $R_{LXN}$ and $R_{LYN}$ differs according to their locations so as to form equipotential lines perpendicular to the applied signals. In other words, in order to form the equipotential lines, the linear resistors $R_{LXN}$ and $R_{LYN}$ become shorter in length or wider in width as they get further from the corner resistors $R_{CXN}$ and $R_{CYN}$, respectively. This is because the voltage drop between the terminal and the grid resistor Rg becomes greater as the linear resistors $R_{LXN}$ and $R_{LYN}$ get farther from the corner resistors $R_{CXN}$ and $R_{CYN}$.

Figure 2:
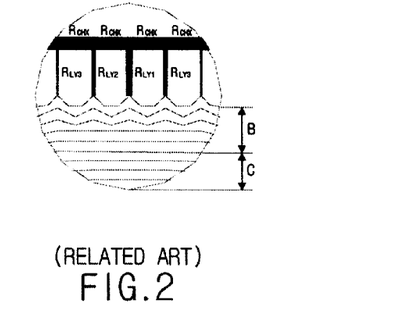
FIG. 2 is an enlarged view illustrating a portion "A" of FIG. 1.

However, as shown in FIG. 2, the potential distribution is not uniform, and the potential distribution becomes more uniform closer to the central portion of the grid resistor Rg. This is because the arrangement of the linear resistors $R_{LXN}$ and $R_{LYN}$ is not as dense as the arrangement of the grid resistor Rg. Therefore, there are connection portions and non-connection portions between the borders of the grid resistor Rg and the linear resistors $R_{LXN}$ and $R_{LYN}$, resulting in a potential difference between the confection portions and the non-connection portions. Therefore, portions "B" of the grid resistor Rg, in which a significant potential difference occurs, cannot serve as an active region "C" for sensing a location of a stylus or a finger. Thus, the non-active area, which is unusable for sensing, is relatively large.

Figure 3:
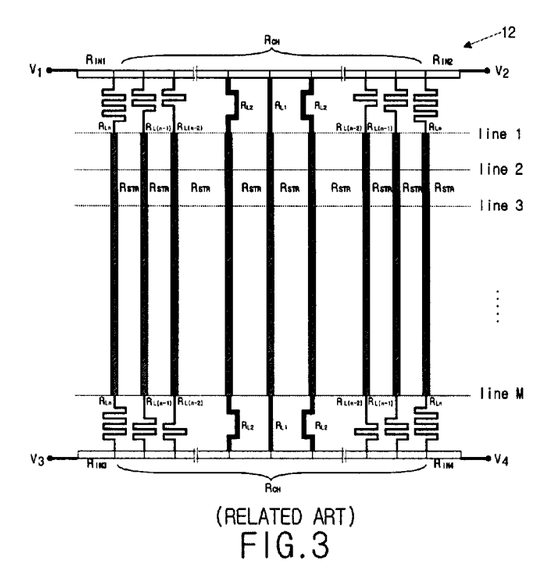
FIG. 3 is a plan view illustrating a resistive touch panel of a conventional digitizer.

FIG. 3 shows a touch panel 12 of a digitizer disclosed in U.S. Pat. No. 4,755,634. As shown in FIG. 3, a resistive touch panel 12 includes a plurality of parallel resistive elements $R_{STR}$ in the form of a strip, whose ends are interconnected with two chain resistor elements $R_{CH}$ through linear resistor elements $R_{Ln}$. The linear resistors $R_{Ln}$ differ in resistance so that the same potential is applied to each strip resistor $R_{STR}$. The chain resistor elements $R_{CH}$ are connected to the terminals $V_1$, $V_2$, $V_3$ and $V_4$ through input resistor electrodes $R_{IN1}$, $R_{IN2}$ $R_{IN3}$ and $R_{IN4}$, respectively. The terminals $V_1$, $V_2$, $V_3$ and $V_4$ are connected to the digitizer drive circuit (not shown).

To derive signals representing coordinate pairs corresponding to the position of a stylus or a finger using the touch panel of FIG. 3, four electrical signals are simultaneously applied to the terminals $V_1$, $V_2$, $V_3$ and $V_4$ from the digitizer drive circuit (not shown). To detect precise x-y coordinate values, it is preferred that the parallel resistive elements $R_{STR}$ have equipotential lines at the same locations along the y-axis of each parallel resistive element $R_{STR}$, regardless of the difference in the signals respectively applied to the terminals $V_1$, $V_2$, $V_3$ and $V_4$.

Figure 4:
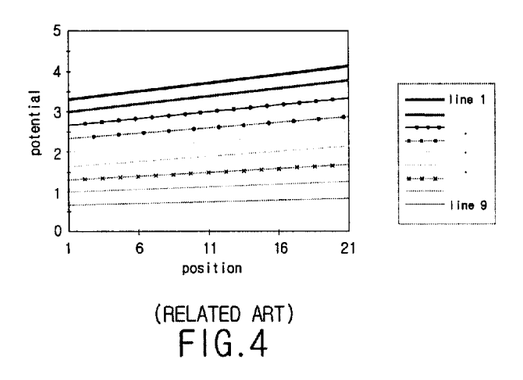
FIG. 4 is a graph illustrating a potential distribution of the digitizer of FIG. 3 when unequal voltages are applied to the terminals of the digitizer.

However, as shown in FIG. 4, the resistive touch panel 12 does not show such desired equipotential distributions when different electrical signals are applied to the terminals $V_1$, $V_2$, $V_3$ and $V_4$. For example, different potentials at each terminal can result when the wires that connect each terminal with the digitizer drive circuit differ in resistance, so that the electrical signals applied at each of the terminals differ. Thus, the actual potential distribution throughout the panel is not uniform and differs from the designed potential distribution. This non-uniform potential distribution results from the resistor structure of the resistive touch panel 12. Because the parallel resistor elements $R_{CH}$ of the resistive touch panel 12 are arranged only in the direction of the x-axis, the potential distribution of the parallel resistor elements $R_{CH}$ shown in FIG. 4 is inferior to that of the grid having an x-y coordinate arrangement. That is, the potential lines are skewed, and therefore, the digitizer cannot produce or detect precise location information indicative of the location of a stylus or a finger.

SUMMARY OF THE INVENTION

Accordingly, the present invention is directed to a digitizer that substantially obviates one or more problems due to limitations and disadvantages of the related art.

An object of the present invention is to provide a digitizer having an improved potential distribution.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof, as well as the appended drawings.

To achieve the above object, and other advantages and in accordance with the purpose of the present invention, as embodied and broadly described, the present invention provides a touch panel for sensing a point of contact on a display. The present invention also provides an apparatus for locating a selected touch point.

One embodiment of the present invention provides an apparatus for locating a selected touch point physically touched by a human finger or a stylus and producing an electrical signal corresponding thereto. The apparatus of this embodiment includes an insulating substrate and a resistor touch pattern supported on the insulating substrate. The resistive touch pattern includes a plurality of strip resistors that are parallel to a center line. The center line is defined by the plurality of strip resistors. Each of the strip resistors has two ends. The resistive touch pattern also includes a plurality of linear resistors that have first and second ends. Each of the first ends of the linear resistors is connected respectively to one of the two ends of the strip resistors. The resistances of two linear resistors connected to the same resistor are equal. The resistance of the linear resistors decreases with their distance from the center line. The distance between the first and second ends of each linear resistance is equal. The resistive touch pattern of this embodiment also includes first and second chain resistors connected to each of the second ends of the plurality of the linear resistors. Each of the chain resistors has a first portion perpendicular to the strip resistors, and second and third portions extending from both ends of the first portion in a direction away from and parallel to the strip resistors. The resistive touch panel of this embodiment also includes first and second edge resistors that are parallel to each other and connect to corresponding second and third portions of the chain resistors. Each of the edge resistors in this embodiment has the same length as the strip resistors. The resistive touch panel of this embodiment also includes first and third terminals, respectively, located on an intermediate point of each first portion of the first and second chain resistors. Each of the first and third terminals is connected to a drive circuit. The first and third terminals are driven simultaneously. The resistive touch panel of this embodiment also includes second and fourth terminals, respectively, located on an intermediate point of each of the edge resistors. Each of the second and fourth terminals is connected to the drive circuit. The second and fourth terminals are driven simultaneously. The apparatus of this embodiment further includes a protective insulating plate arranged over the resistive touch pattern. The first and third terminals and the second and fourth terminals are driven by the drive circuit alternatively. The apparatus further includes a transparent conductive plate arranged between the substrate and the protective insulating plate, and dot spacers located between the resistive pattern and the transparent conductive plate. The transparent conductive plate has a low-resistive metal film surrounding the edge of the transparent conductive plate and a lead line for outputting the electrical signal representing a location of the stylus or the finger.

Another embodiment of the present invention includes a touch panel having a plurality of strip resistors parallel to one another and first, second, third and fourth electric signal terminals. The first and third terminals are positioned on the midpoint of opposite edges of the touch panel. The second and fourth terminals are positioned on the midpoint of opposite edges of the touch panel. This embodiment further includes respective linear resistors connected between a respective end of a corresponding strip resistor and one of the electric signal terminals. Each linear resistor has a resistive value matched to the corresponding strip resistor to produce an equal potential at a corresponding selected point on all of the strip resistors.

Another embodiment of the present invention provides a touch panel for sensing a point contacted on a display that includes a plurality of strip resistors parallel to one another. Each of the strip resistors has first and second ends. The touch panel of this embodiment further includes a plurality of electric signal terminals. The first and third electric signal terminals are located, respectively, on first and third edge portions of the touch panel. The first and third edge portions are opposite to one another. The second and fourth electric signal terminals are located, respectively, on second and fourth edge portions of the touch panel. The second and fourth edge portions are opposite to one another. Each of said electric signal terminals is located at the midpoint of its respective edge portion. The touch panel further includes a plurality of linear resistors. For each strip resistor, a first respective linear resistor is connected between the first end of the corresponding strip resistor and one of the electric signal terminals. A second respective linear resistor is connected between the second end of the corresponding strip resistor and another of the electric signal terminals. Each of the linear resistors has a resistive value selected for its corresponding strip resistor to produce an equal potential at a corresponding selected point on all of the strip resistors.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the invention and, together with the description, serve to explain the principles of the invention. Like reference numerals denote like parts.

DETAILED DESCRIPTION OF PREFFERED EMBODIMENTS

Reference will now be made in detail to the preferred embodiment of the present invention, an example of which is illustrated in the accompanying drawings.

Figure 5:
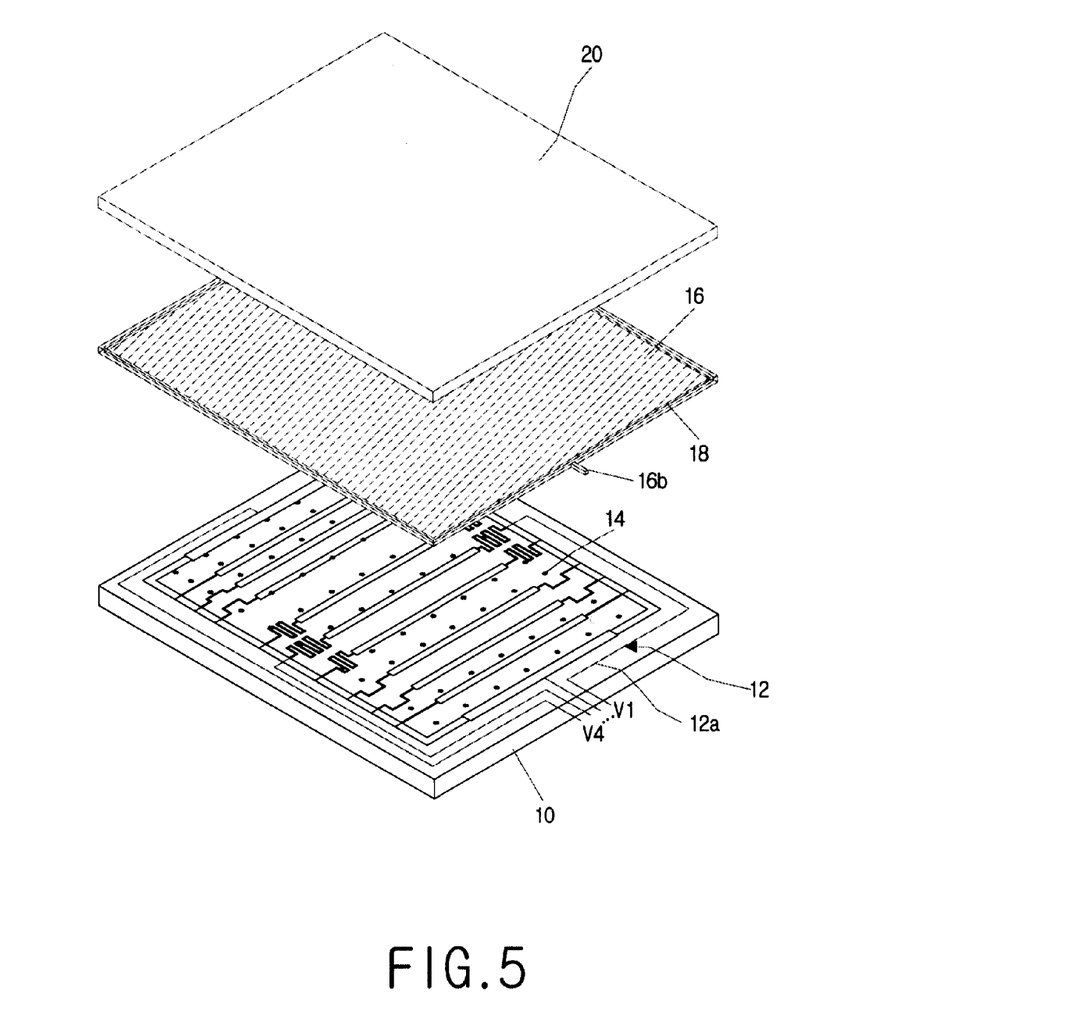
FIG. 5 is a perspective view illustrating a configuration of a resistive type digitizer according to a preferred embodiment of the present invention.

FIG. 5 is a perspective view illustrating the configuration of a resistive type digitizer according to a preferred embodiment. As shown in FIG. 5, the digitizer according to the preferred embodiment comprises a substrate 10 having a resistor touch panel 12, a transparent conductive plate 16 arranged on the substrate 10, and a protective insulating plate 20 arranged on the transparent conductive plate 16. The digitizer also includes a strip and dot spacers 14 between the transparent conductive plate 16 and the resistor touch panel 12. The transparent conductive plate 16 has a low-resistive metal film 18 surrounding its edges (for example, a silver pattern) and a lead line 16b.

Figure 6:
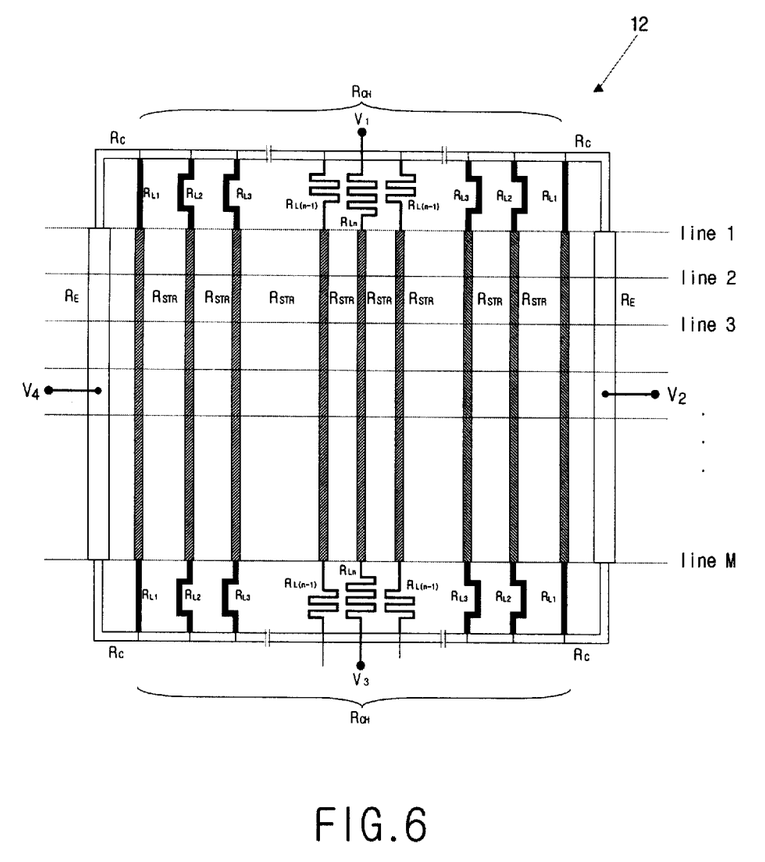
FIG. 6 is a plan view illustrating a resistive touch panel of the digitizer according to the preferred embodiment of the present invention.
Figure 7:
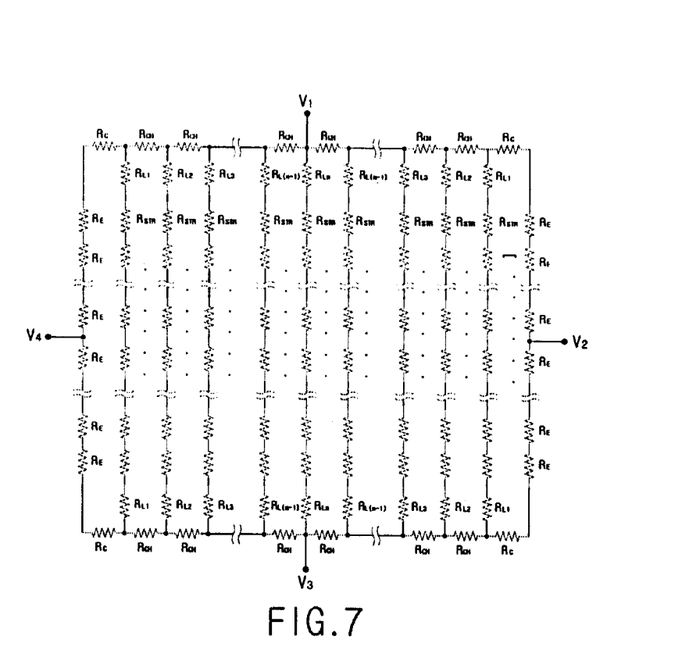
FIG. 7 is a plan view illustrating a schematic equivalent circuit of the resistive touch panel of the digitizer according to the preferred embodiment of the present invention.

The resistor touch panel 12 is shown in FIG. 6. A schematic of an equivalent circuit of touch panel 12 is shown in FIG. 7. The preferred embodiment of touch panel 12 includes a plurality of parallel strip resistors $R_{STR}$ and two chain resistors $R_{CH}$, at least one of the chain resistors connected with one end of each of a plurality of the strip resistors $R_{STR}$ through one of a plurality of linear resistors $R_{Ln}$. Two edge resistors $R_E$ connect to the two chain resistors $R_{CH}$, respectively, through four corner resistors $R_C$ and wires 12a. The strip resistors $R_{STR}$, as location-sensing elements, are spaced apart from the edge resistors $R_E$ and arranged regularly parallel to each other. Both terminals of the centermost strip resistor $R_{STR}$ are connected to terminals $V_1$ and $V_3$ through linear resistors $R_{Ln}$. The terminals of the remaining strip resistors $R_{STR}$ are connected to the digitizer drive circuit (not shown) through other linear resistors $R_{Ln}$. The edge resistors $R_E$ are connected to terminals $V_2$ and $V_4$, respectively.

The chain resistor $R_{CH}$ is made of a low-resistive metal and serves to convey electrical signals to or from the digitizer drive circuit (not shown) to the strip resistors $R_{STR}$, preferably without any change. The corner resistors $R_C$ are made of metal having a resistance lower than the chain resistor $R_{CH}$. Each of the linear resistors $R_{Ln}$ has a resistance value that is selected to form lines of equal potential, line 1, line 2, . . . , line M, perpendicular to the direction of the electrical signals applied from the drive circuit. That is, the linear resistors $R_{Ln}$ closer to the center of the touch panel 12 have greater resistance than the linear resistors $R_{Ln}$ closer to the corner of the touch panel 12. Thus, the resistive value of the linear resistor $R_{Ln}$ may differ from each other.

The operation of the digitizer having the structure described above according to the first embodiment of the present invention is discussed below. To derive signals representing the position of a stylus or a finger, an a.c. reference potential is applied to either two of terminals $V_1$ and $V_3$ or $V_2$ and $V_4$. Electrical signals from either two of terminals $V_1$ and $V_3$ or $V_2$ and $V_4$ are thus applied to the resistive touch panel 12 through the wires 12a. When a.c. reference potentials are applied to terminals $V_1$ and $V_3$, terminals $V_2$ and $V_4$ are retained in a 'ground' state, and vice versa. Then, when a stylus or a finger contacts the protective insulating plate 20, the transparent conductive plate 16 and the resistive plate touch panel 12, which are otherwise spaced apart from each other by the dot spacers 14, are electrically connected with each other at the contact location. Electrical signals representing the contact location are conveyed through the lead line 16b. The digitizer thus outputs the location information determined from the information conveyed by the electrical signals by a predetermined program.

Figure 8:
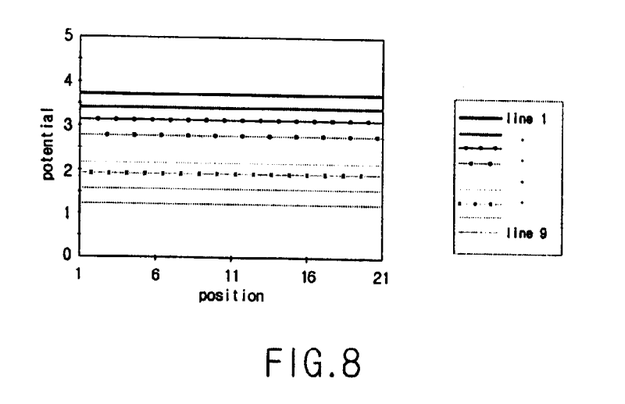
FIG. 8 is a graph illustrating a potential distribution of the digitizer according to the preferred embodiment of the present invention.

FIG. 8 shows some exemplary lines of equal potential perpendicular to the direction of the applied electrical signals on the strip resistors $R_{STR}$ according to the present invention when the reference potential of 5 volts is applied to terminal $V_1$ and 0 volt is applied to terminal $V_3$, and terminals $V_2$ and $V_4$ are retained in a 'ground' state. The horizontal axis denotes a location of each strip resistors $R_{STR}$, and the vertical axis denotes potentials along the strip resistors $R_{STR}$. As shown in the graph of FIG. 8, the equipotential lines are formed for the every y-axis (vertical) value, regardless of the x-axis (horizontal) value, i.e., the position of the strip resistor $R_{STR}$. In other words, there is a uniform potential distribution perpendicular to the input signals throughout the whole panel, which results in more precise detection of the location of the stylus or finger.

Figure 9:
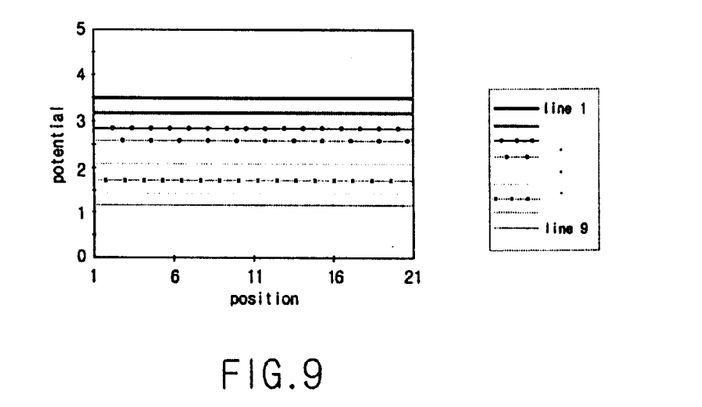
FIG. 9 is a graph illustrating a potential distribution of the digitizer according to the preferred embodiment of the present invention when an unequal potential is applied.

FIG. 9 shows an example of the potential distribution of each of the strip resistors $R_{STR}$ of the resistive touch panel 12 of the digitizer of the preferred embodiment when different electrical signals are applied to the terminals. Such different electrical signals could result, for example, from the difference in the resistance of wires that connect the terminals with the digitizer drive circuit. As shown in the graph of FIG. 9, the equipotential lines are formed corresponding to the same y-axis position for each strip resistor. The lines of equipotential result because, even though different electrical signals are applied to the terminals $V_1$ and $V_3$, the electrical signal applied to the terminal $V_1$ is symmetrically distributed in the upper and lower portions of the circuit, centering on the terminal $V_1$. Similarly, the electrical signal applied to the terminal $V_3$ is symmetrically distributed in right and left directions centering on the terminal $V_3$. Thus, an equipotential distribution perpendicular to the input signals is generated throughout the whole touch panel.

Figure 10:
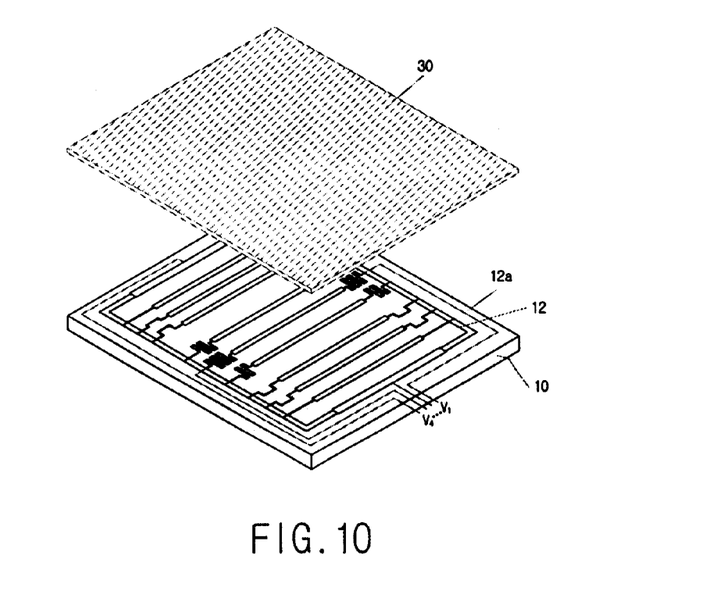
FIG. 10 is a perspective view illustrating a configuration of a capacitive type digitizer according to another embodiment of the present invention.

FIG. 10 shows a configuration of a capacitive type digitizer according to another embodiment of the present invention. As shown in FIG. 10, the capacitive type digitizer comprises a substrate 10 having a resistive touch panel 12 and a protective insulating plate 30. The resistive touch panel 12 is of the type shown in FIG. 6. The protective insulating plate 30 serves to prevent an electric field from affecting the digitizer.

The capacitive type digitizer according to the present invention operates as follows. First, when a stylus or a finger contacts the protective insulating plate 30, a capacitor is formed between the stylus and the strip resistor $R_{STR}$. The electrical signals applied to the strip resistor $R_{STR}$ then flow along the stylus or the finger through the capacitance formed between the stylus or the finger and the strip resistor $R_{STR}$. Current that flows along the stylus or the finger is measured at the terminals $V_1$ and $V_3$ or $V_2$ and $V_4$ to determine the location of the stylus or the finger.

As described herein, the digitizer according to the preferred embodiment of the present invention causes equipotential lines to be formed at the same y coordinate values. Such constant equipotential lines occur in the touch panel of the present invention even though different electrical signals are applied to each of the terminals, perhaps as a result of difference in the resistance of wires that connect the terminals with the digitizer drive circuit.

It will be apparent to those skilled in the art that various modifications and variations can be made in a Digitizer as described herein without departing from the spirit or scope of the present invention. Thus, it is intended that the present invention covers the modifications and variations of this invention provided they come within the scope of the appended claims and their equivalents.

What is claimed is:

1. A touch panel for sensing a point contacted on a display, comprising:
    a plurality of strip resistors parallel to one another, each of said strip resistors having first and second ends;
    a plurality of electric signal terminals, first and third of said electric signal terminals located, respectively, on first and third edge portions of the touch panel, said first and third edge portions being opposite one another; second and fourth of said electric signal terminals located, respectively, on second and fourth edge portions of the touch panel, second and fourth edge portions being opposite one another and containing an edge resistor, wherein each of said electric signal terminals is located at the midpoint of its respective edge portion; and
    a plurality of linear resistors, wherein, for each strip resistor, a first respective one of said linear resistors is connected between the first end of said corresponding strip resistor and one of said electric signal terminals and a second respective one of said linear resistors is connected between the second end of the corresponding strip resistor and another of said electric signal terminals, each of said linear resistors having a resistive value selected for its corresponding strip resistor so as to produce equal potential at a corresponding selected point on all said strip resistors.

2. The touch panel of claim 1, wherein the distance between said selected point and said first end is the same for each of said strip resistors.

3. The touch panel of claim 1, wherein the touch panel has a rectangular configuration.

4. The touch panel of claim 1, wherein said first and third electric signal terminals and said second and fourth electric signal terminals are connected to alternately receive electrical signals from a drive circuit.

5. The touch panel of claim 1, further comprising:
    at least two edge resistors parallel to the strip resistors, and each of said edge resistors located adjacent to said second and fourth edge portions, respectively,
        wherein said second and fourth electric signal terminals are connected to a respective one of said edge resistors.

6. The touch panel of claim 1, wherein said second and fourth edge portions are parallel to said strip resistors.

7. The touch panel of claim 1, wherein the length of each of said linear resistors is equal.

8. The touch panel of claim 1, wherein the resistive value of the linear resistors corresponding to a strip resistor near one of said second and fourth edge portions is less than the resistive value of the linear resistors closer to the center of the touch panel.

9. The touch panel of claim 1, wherein the resistive value of said first respective one of said linear resistors is equal to the resistive value of said second respective one of said linear resistors.

10. The touch panel of claim 6, further comprising:
    at least two chain resistors, perpendicular to said edge resistors, each of said chain resistors connected between a portion of said linear resistors and said first and third electric signal terminals; and
    a plurality of corner resistors, connected between said chain resistors and said edge resistors.

11. An apparatus for locating a selected touch point physically touched by a human finger or a stylus and producing an electrical signal corresponding thereto, comprising:
    an insulating substrate;
    a resistor touch pattern supported on the insulating substrate, the resistive touch pattern having:
        a plurality of strip resistors parallel to a center line defined by the plurality of strip resistors, each having two ends;
        a plurality of linear resistors having first and second ends, each first ends connected respectively to one of the two ends of each of the plurality of strip resistors, resistances of every two linear resistor connected to the two ends of a single one of the plurality of strip resistor being equal, the resistance of the linear resistors decreasing with distance from the center line, a distance between the first and second ends of each linear resistance being equal;
        first and second chain resistors connected to each of the second ends of the plurality of the linear resistors, each of the chain resistors having a first portion disposed perpendicular to the strip resistors and second and third portions elongated from both ends of the first portion in an opposing direction and parallel to the strip resistors;
        first and second edge resistors parallel to each other and connected to corresponding second and third portions of the chain resistors, each having the same length as the strip resistors;
        first and third terminals, respectively, positioned on an intermediate point of each first portion of the first and second chain resistors, each of the first and third terminals connected to a drive circuit and driven at a same time; and
        second and fourth terminals, respectively, positioned on an intermediate point of each of the edge resistors, each of the second and fourth terminals connected to the drive circuit and driven at a same time to create an active region defined between the edge resistors of the second and fourth terminals; and
    a protective insulating plate arranged over the resistive touch pattern,
        wherein the first and third terminals and the second and fourth terminals are driven by the drive circuit alternatively.

12. The apparatus of claim 11, further comprising:
    a transparent conductive plate arranged between the substrate and the protective insulating plate; and
    dot spacers located between the resistive pattern and the transparent conductive plate, wherein the transparent conductive plate has a low-resistive metal film surrounding edge of the transparent conductive plate and a lead line for outputting an electrical signal representing a location of the stylus or the finger.

13. A touch panel for sensing a point of contact on a display, comprising:
    a plurality of strip resistors parallel to one another;
    first, second, third and fourth electric signal terminals, the first and third terminals positioned on the midpoint of opposite edges of the touch panel and the second and fourth terminals positioned on the midpoint of opposite edges of the touch panel to create an active region defined between the second and fourth terminals; and
    a respective linear resistor connected between a respective end of corresponding strip resistor and at least one of said electric signal terminals, each linear resistor having a resistive value matched to said corresponding strip resistor so as to produce equal potential at a corresponding selected point on substantially all said strip resistors.

14. An apparatus for sensing a physical point of contact on a surface and producing an electrical signal corresponding thereto, comprising:

an insulating substrate a touch panel having a plurality of strip resistors parallel to one another; first, second, third and fourth electric signal terminals, the first and third terminals positioned on the midpoint of opposite edges of the touch panel and the second and fourth terminals positioned on the midpoint of opposite edges of the touch panel to create an active region defined between the second and fourth terminals; a respective linear resistor connected between a respective end of corresponding strip resistor and at least one of said electric signal terminals, each linear resistor having a resistive value matched to said corresponding strip resistor so as to produce equal potential at a corresponding selected point on substantially all said strip resistors; and a protective insulating plate arranged on the touch panel.

15. The apparatus of claim 14, further comprising:

a transparent conductive plate between the substrate and the protective insulating plate; and dot spacers between the touch panel and the transparent conductive plate; and a lead line connected to said transparent conductive plate for conveying electrical signals from the conductive plate when the conductive plate is depressed to be in contact with the touch panel.

16. The touch panel according to claim 1, wherein an active region is created spanning the edge resistors of the second and fourth edge portions.

17. A touch panel for sensing a point contacted on a display within a active region, comprising:

a plurality of strip resistors parallel to one another, each strip resistor having first and second ends;

a plurality of electric signal terminals, first and third of said electric signal terminals located, respectively, on first and third edge portions of the touch panel, and second and fourth of said electric signal terminals located, respectively, on second and fourth edge portions of the touch panel, wherein each of said electric signal terminals is located at a midpoint of its respective edge portion; and at least one pair of edge resistors parallel to one another, each individual edge resistor of the at least one pair placed along the second and fourth edge portions of the touch pad to create the active region defined between the second and fourth terminals.

* * * * *